Aug. 25, 1931.  K. ENGELHARDT  1,820,531

DYNAMO ELECTRIC MACHINE CONSTRUCTION

Filed March 12, 1927

INVENTOR
Karl Engelhardt
BY
ATTORNEYS

Patented Aug. 25, 1931

1,820,531

UNITED STATES PATENT OFFICE

KARL ENGELHARDT, OF KENILWORTH, NEW JERSEY, ASSIGNOR TO ELECTRO DYNAMIC COMPANY, OF BAYONNE, NEW JERSEY, A CORPORATION OF NEW JERSEY

DYNAMO-ELECTRIC MACHINE CONSTRUCTION

Application filed March 12, 1927. Serial No. 174,791.

This invention relates to the construction of dynamo-electric machines, and has particular reference to the construction of induction, synchronous or like types of machines which are equipped with a stator or stationary magnetic element. The object of this invention is to provide a machine of rugged construction, having a novel stator, and one which is assembled in an improved manner.

The stators of most types of dynamo-electric machines are elaborate and expensive in construction, and require a number of machining and assembling operations before they may be properly mounted in the electric machine. In laminated stators especially, the laminations are assembled between end plates to which they are fastened by bolts, rivets, or the like, which usually pierce the laminations as well as the end plates. The punching of the bolt or rivet holes increases the cost by requiring punching dies, the forcing of the bolts or rivets through the punchings, and the subsequent peening over or riveting is a comparatively expensive operation. In addition to making an expensive structure, these bolts or rivets often short-circuit the laminations between the end plates, as well as induce eddy currents and other electrical losses with the consequent heating effect during the operation of the machine, since these bolts or rivets are well within the magnetic circuit. Even if the rivets or bolts are varnished or otherwise insulated before insertion through the laminæ, the insulation coating is often scraped from them while they are being inserted, and thus cause a short-circuiting contact with the laminations.

Owing to the use of end plates, keys, lugs, bolts or registering slots are provided on the machine frame and on the end plates for fastening the stator unit in place. This involves considerable labor and expense and is usually done before the stator is wound, so that the subsequent winding is awkward and laborious, as it involves the manipulation of the entire machine frame in which the stator is mounted. Winding of the stator is done after assembling so as to avoid the injury to the windings which would occur if they were inserted before mounting the stator in the frame. Furthermore, when the insulating varnish is applied to the wound stator, it is necessary to dip the entire frame and stator structure in the varnish for proper impregnation of the stator and its winding, and thus considerably more of the expensive varnish is used than is necessary, and much of this varnish must be subsequently removed from parts of the frame.

In order to overcome these expensive and laborious operations, the present invention provides a dynamo-electric machine in which the stator is made and assembled as a complete unit before being mounted in the machine frame. This stator unit eliminates the use of end plates, fastening rivets or bolts and the consequent liability of short-circuiting which their use imposes, as there are no fastening means within the magnetic circuit. The stator structure may be mounted in the machine frame with facility and rapidity, requiring no additional parts such as keys, clips or lugs, and but one machining operation on the machine frame only. As this stator is assembled as a complete unit before it is mounted in the machine frame, it has been previously wound and impregnated with insulating varnish or other like substance, thereby eliminating the labor encountered in winding the stator when it is in place in the frame, and also saving a great amount of insulating varnish which has been heretofore wasted on the machine frame.

Inasmuch as these stator units are completely assembled and interchangeable, they may be mounted in machine frames of different types depending upon the use to which the machine is to be applied. For example, a number of standardized closed, open, or partially closed housing frames, which are all provided with means for mounting the standard stator unit or cartridge, may form a reserve supply as well as the standard stator units. Thus a machine for any purpose may be quickly supplied with little labor, merely by mounting the stator cartridge and a similarly standardized rotor in one of the selected frames. The machines may be rapidly repaired in the same manner by removing the stator unit and replacing it with another standard stator cartridge, thereby eliminating the necessity of removing the entire machine and the loss of its service while it is being repaired.

For a better understanding of the invention, reference may be made to the accompanying drawings, in which Figure 1 is a side view of a dynamo-electric machine, shown in partial section in order to illustrate the invention;

Figure 1:
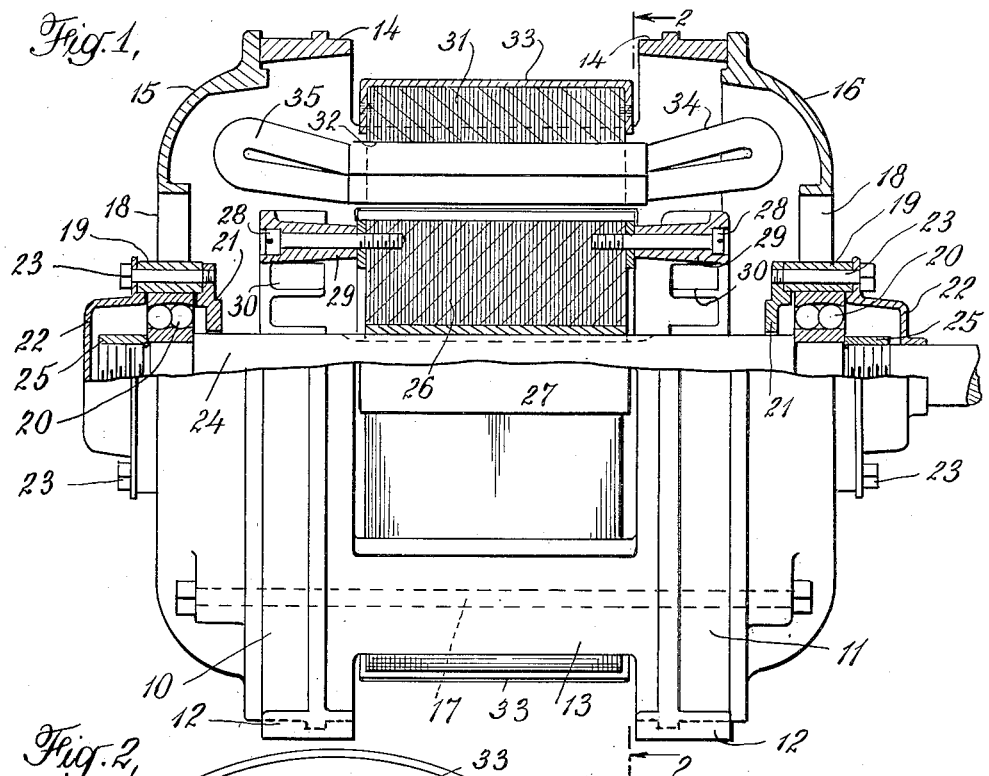

Referring to the drawings, the machine, which may be either a motor or a generator, and is illustrated as an induction motor having a rigid spider frame comprising the circular supportng rings 10 and 11 provided with integral feet 12 for mounting the machine to a suitable foundation, and cross-bars 13 connecting rings 10 and 11. Supporting rings 10 and 11 are provided with grooves 14 for the reception of the edges of a cover band so that the motor may be converted into the enclosed type.

Figures 2, 3:
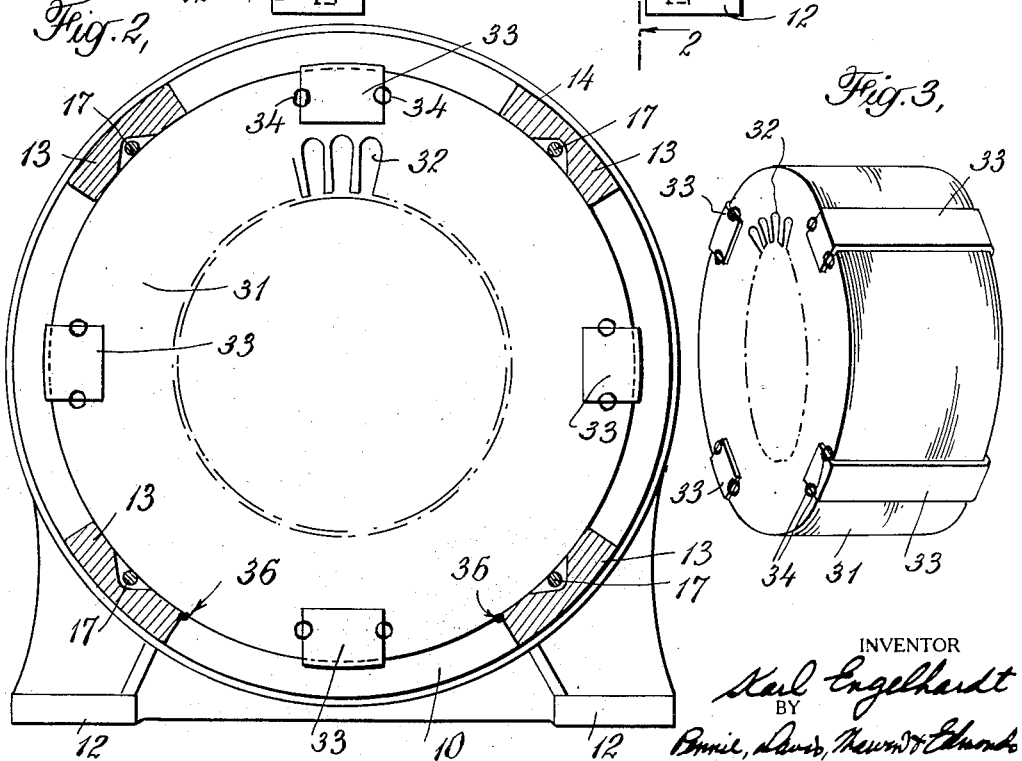
Fig. 2 is a cross section taken along line 2—2 of Fig. 1.
Fig. 3 is a perspective view of the stator punchings.

A pair of cover plates 15 and 16 engage the edges of rings 10 and 11, respectively, and are held in place by a number of connecting bolts 17, which lie in grooves provided therefor in bars 13, as shown in Fig. 2. Cover plates 15 and 16 are provided with openings 18, for the passage of cooling air, and integral hubs 19, in which are fitted ball bearings 20 held in place between inner rings 21 and hub caps 22 by means of tap bolts 23. The rotor shaft 24 is journalled in bearings 20, each end of which is provided with a threaded collar 25 for holding the bearing on the shaft. One of the hub caps 22 is provided with a central opening for this shaft.

The rotor consists of shaft 24 on which is mounted the armature 26 by means of key 27. Mounted upon each end of armature 26 by means of tap bolts are collars 29 having integral fan blades 30, so that air is drawn through openings 18 in the end covers and circulated through the interior of the motor for the purpose of cooling the operating parts.

The stator core 31, shown in perspective in Fig. 3, comprises a plurality of laminated sheets provided with slots 32 for the reception of the stator windings and having a central opening for the rotor 26. These laminations are insulated from each other by dipping them in insulating varnish or other material, and are stacked so that corresponding winding slots 32 register properly. The insulation-coated stack of laminations is then compressed by any suitable means so that a compact unit is formed, and while in this condition, a number of bands or clamps 33 are forced over the opposite edges of the stack. These clamps or bands 33 may be shaped before being applied to the core 31, or they may be hot or cold pressed in place, and are preferably transversely curved so as to conform to the curvature of the surface of the stack of laminations. The clamps 33 are then preferably fixed in place by arc-welding their ends at points 34 to the surfaces of the end laminations, thus holding all of the laminated sheets together as a compact, solid core without employing bolts, rivets or the like through the sheets or in any other way disturbing them, so that the insulation layers of varnish on the surface of and between the sheets remain unbroken and proof against short-circuiting. As there are no bolts, rivets or the like within the magnetic circuit, no additional eddy currents are set up and the consequent unnecessary heating is eliminated. The clamps 33 are outside of the magnetic circuit. As all of the laminæ constituting stator core 31 are held in place between the end sheets by means of clamps 33, the necessity of additional end plates is obviated.

After the core 31 is assembled and completed, windings 35 are introduced in winding slots 32 in the usual manner. As the winding is done on the relatively small stator core 31 alone, the operation is greatly facilitated over the former method of winding the stator after it is mounted in the machine frame, whereby it was necessary to manipulate a large and cumbersome mass which included the frame of the machine as well as the stator. After stator core 31 is wound, it is dipped into insulating varnish or the like, whereby the whole unit is insulated, whereas heretofore much of the expensive insulating compound was wasted upon the frame when the winding was done with the stator mounted in the frame.

In mounting the stator core 31 in the machine, the inner surfaces of cross bars 13 are machined so that core 31 will fit between them with a close sliding fit so that it is substantially retained in place. In order to fix the core in this position, a few lines or spots of welding 36 are made between the surface of stator 31 and some of the inner edges of cross-bars 13, as shown in Fig. 2. Ordinarily two or three lines of welding, depending on the size of the machine, are sufficient to hold the stator core 31 in place. These few welded connections 36 are preferably light so that they may be broken without great effort in the event that a new stator is required, which is inserted as a complete cartridge upon the removal of the old stator, in the manner described. As the stator core is retained in place by the friction between it and the frame, these light lines of welding are sufficient to absorb any torque developed by the drag between the rotor and stator which would tend to rotate the stator in its frame, and thus the use of keys or other separate securing means which require additional machining operations is eliminated.

In the construction shown in Fig. 1, fan blades 30, mounted in armature collars 28, draw air through openings 18 and circulate it around armature 26, stator windings 35, over stator 31 and out through the spaces between stator 31 and supporting rings 10 and 11.

A dynamo-electric machine constructed in the manner described is simple and presents a considerable saving of labor and expense in manufacture, assembly, and replacement. In constructing the stator it is only necessary to provide a number of properly punched sheets and the bands or clamps for holding them together as a core, without the need of rivets, bolts or the like, nor the necessity of end plates. In assembling, the machining of co-acting parts for fastening the stator in place is replaced by a simple welding operation. In replacing the stator, in case of a defective or damaged winding, it is not necessary to obtain a new machine frame as the stator can be removed in the manner above described and a new complete stator cartridge can be readily substituted for the old one.

The term "tack-welding" or "tack-welded", as used in the appended claims, is used to designate a weld or a method of welding in which the weld is only made at spots and may be readily ruptured at some subsequent time should it be desirable.

I claim:

1. In a dynamo-electric machine, the combination of a frame including a plurality of cross-bars, and a stator in said frame between the cross-bars, said stator comprising superimposed laminations and bands embracing said laminations to hold them together, and welding between at least one cross-bar and the stator for securing the stator to the frame.

2. A dynamo-electric machine, comprising a frame having an opening for the reception of a stator unit, a complete stator unit in the opening in said frame, and tack welded means for securing the stator unit in said frame.

In testimony whereof I affix my signature.

KARL ENGELHARDT.